United States Patent
Mendolera

(10) Patent No.: US 7,391,566 B2
(45) Date of Patent: Jun. 24, 2008

(54) MICROSCOPE HAVING EYEPIECE RETICLE SLIDER

(75) Inventor: Richard J. Mendolera, Buffalo, NY (US)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 11/381,167

(22) Filed: May 2, 2006

(65) Prior Publication Data

US 2007/0258136 A1 Nov. 8, 2007

(51) Int. Cl.
*G02B 21/02* (2006.01)

(52) U.S. Cl. ........................................ 359/381
(58) Field of Classification Search .................. 359/381
See application file for complete search history.

(56) References Cited

U.S. PATENT DOCUMENTS 3,414,349 A * 12/1968 Vencel et al. ............... 351/243
4,135,778 A * 1/1979 Lincoln ...................... 359/381
4,172,662 A 10/1979 Vogel
5,815,311 A * 9/1998 Ishikawa .................... 359/381
2001/0040739 A1* 11/2001 Grafenhain ................. 359/808
2006/0011456 A1 1/2006 Woditschka
2006/0103920 A1* 5/2006 Jagemann ................... 359/368

FOREIGN PATENT DOCUMENTS

JP 02090134 * 3/1990

* cited by examiner

*Primary Examiner*—Joshua L Pritchett
(74) *Attorney, Agent, or Firm*—Hodgson Russ LLP

(57) ABSTRACT

A viewing tube of a microscope is provided with a circumferential slot, and a slider carrying an optical element, such as a reticle, is removably received through the slot to position the optical element on an optical axis of the viewing tube proximate to an insertion end of an eyepiece received by the viewing tube. A collar or other cover means is provided to close off the slot when it is not in use. The invention enables quick change of optical elements in the viewing tube without removal of the eyepiece from the viewing tube.

8 Claims, 2 Drawing Sheets

MICROSCOPE HAVING EYEPIECE RETICLE SLIDER

FIELD OF THE INVENTION

The present invention relates generally to the field of microscopes, and more particularly to insertion and removal of an optical element into an optical path of the microscope.

BACKGROUND OF THE INVENTION

It is known to place an optical element, in particular a reticle having a measurement scale, into an eyepiece of a microscope, which in turn is received in a viewing tube of the microscope. For example, U.S. Pat. No. 4,172,662 to Vogel describes an eyepiece for a microscope wherein the eyepiece includes a main eyepiece tube 7 and an extension tube 6 coaxially received by the main eyepiece tube 7. A reticle 1 is mounted within the extension tube 7 and includes both a length scale and an angle scale. In order to change reticles for different applications, the user must remove the eyepiece from the viewing tube of the microscope, pull the extension tube out of the main eyepiece tube, extract the reticle and insert a different reticle, reinsert the extension tube into the main eyepiece tube, and replace the eyepiece in the viewing tube of the microscope. This operation is time consuming and carries significant risk that the optical elements of the eyepiece, including the reticle, will be smudged by finger contact. Moreover, if the eyepiece is locked in place in the viewing tube to prevent loss and theft, then exchange of the reticle becomes impossible.

Thus, a need exists for an improvement that allows optical elements to be quickly and easily inserted into and removed from a viewing tube of a microscope.

SUMMARY OF THE INVENTION

In accordance with the present invention, this need is met by a microscope comprising a microscope stand; a microscope tube mounted on the stand, the microscope tube including a viewing tube having an optical axis and a circumferential slot extending through a wall of the viewing tube; an eyepiece having an insertion end sized for receipt by the viewing tube; and a slider including an optical element and a grip portion, the slider being removably insertable through the slot in the viewing tube to position the optical element in the optical axis. The slot is preferably positioned proximate to the insertion end of the eyepiece when the eyepiece is received by the viewing tube. The optical element carried by the slider may be a scale-bearing reticle, filter, polarization analyzer, lens, grating, shutter, or any other optical element. A collar axially adjustable along the viewing tube, or other cover means, is provided for selectively closing off the slot when it is not used to receive a slider.

The present invention also provides a method of changing an optical element in a viewing tube of a microscope comprising the steps of: inserting a first slider carrying a first optical element through a circumferential slot in the viewing tube to position the first optical element in the viewing tube; removing the first slider from the slot; and inserting a second slider carrying a second optical element through the circumferential slot in the viewing tube to position the second optical element in the viewing tube.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
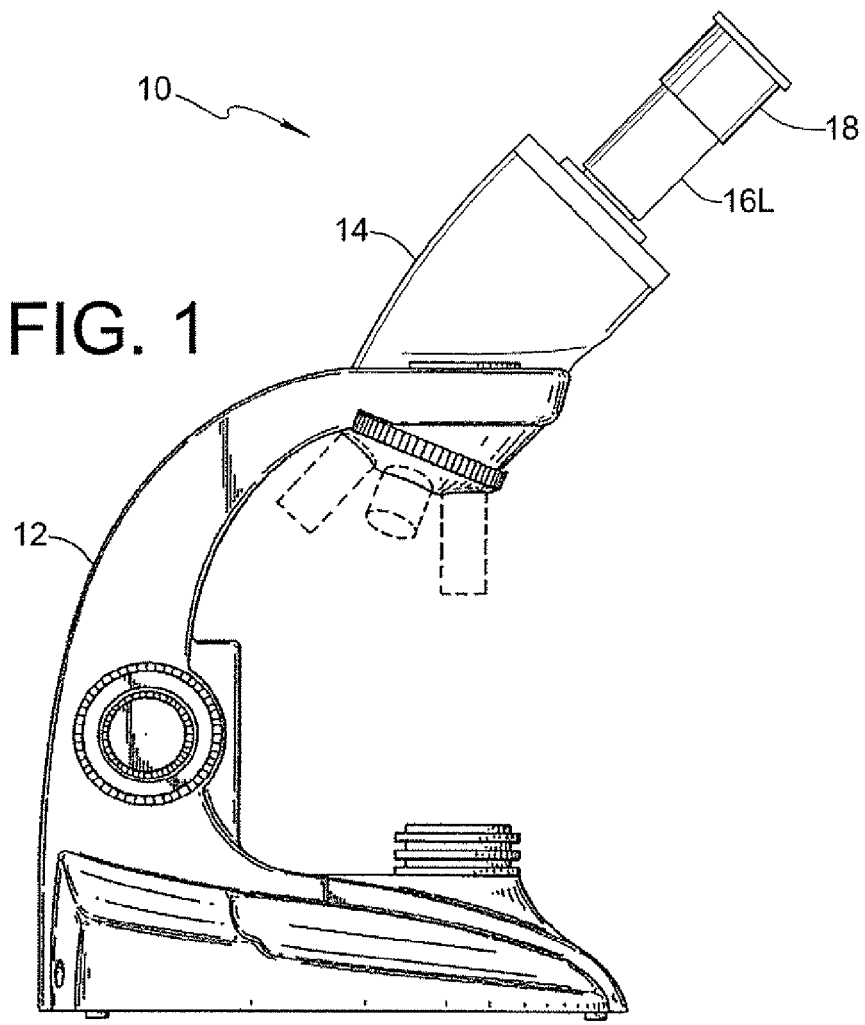
FIG. 1 is a left side elevational view of a microscope comprising an eyepiece reticle slider in accordance with an embodiment of the present invention.
Figure 2:
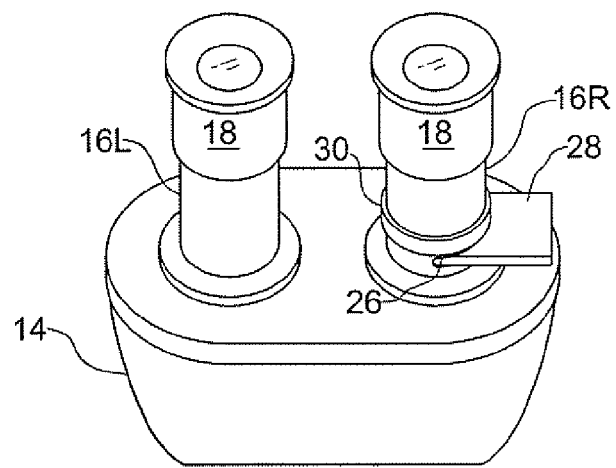
FIG. 2 is a front elevational view of a tube of the microscope shown in FIG. 1.
Figure 3:
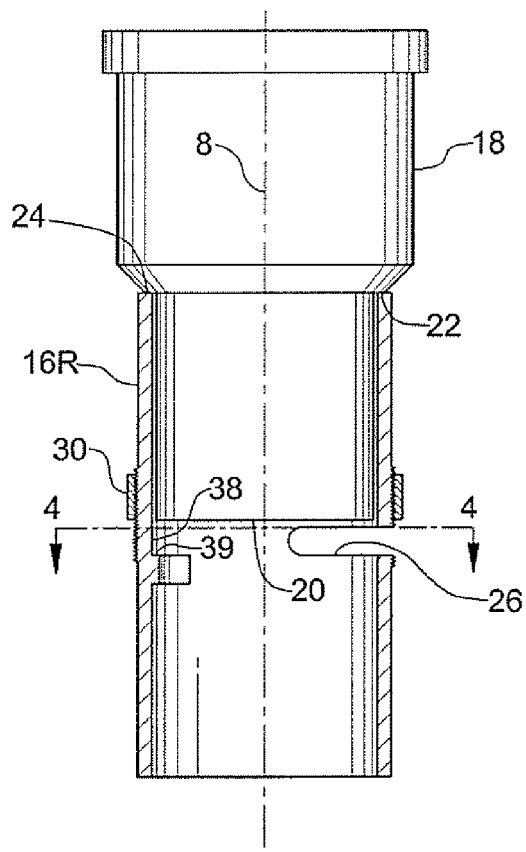
FIG. 3 is a cross-sectional view of a right viewing tube of the microscope tube shown in FIG. 2.

Referring to FIGS. 1-3, a microscope 10 is shown as comprising a stand 12 and a tube 14 mounted on the stand 12. As best seen in FIG. 2, tube 14 is depicted as being a binocular tube having a left viewing tube 16L and a right viewing tube 16R. It is understood, however, that tube 14 may be a monocular tube having a single viewing tube.

Each viewing tube 16L, 16R is sized to slidably receive an eyepiece 18 which has an insertion end 20 fitting into the viewing tube and a radial step 22 for limiting the axial distance of the insertion end 20 from a receiving end 24 of the viewing tube when eyepiece 18 is inserted into the viewing tube. By inserting eyepiece 18 into the viewing tube 16L or 16R, the eyepiece is aligned along an optical axis 8 of the viewing tube which follows an observation optical path of microscope 10.

In the embodiment presently being described, right viewing tube 16R includes a circumferential slot 26 therethrough for receiving a slider 28. Slot 26 is shown as being through an angle of approximately 180 degrees about the optical axis 8 of the viewing tube 16R, however other angular extents of slot 26 are possible. Viewing tube 16R further includes an annular collar 30 that is axially adjustable along the viewing tube to selectively cover slot 26 when the slot is not in use and uncover slot 26 when slider 28 is to be inserted. Collar 30 may be slidably movable along viewing tube 16R, or threadably adjustable along the viewing tube as shown in FIG. 3. Other arrangements for selectively covering slot 26 are of course possible, such as a flexible flap extendable over the slot.

Figure 4:
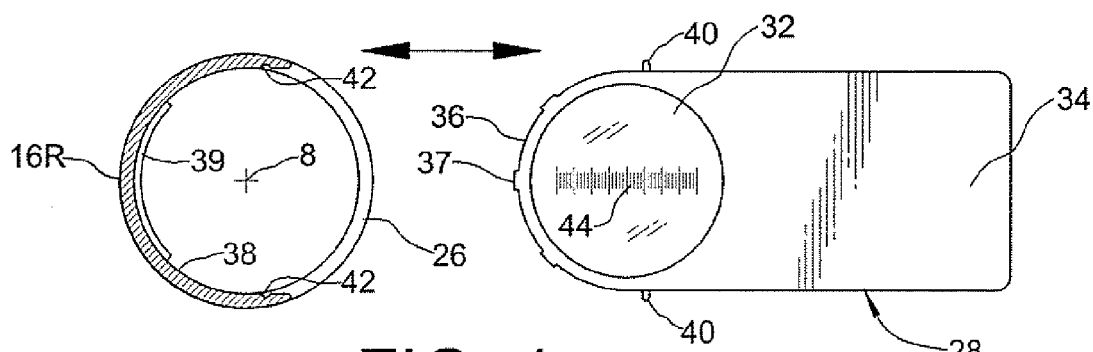
FIG. 4 is a view taken generally along the line 4-4 in FIG. 3, wherein a reticle slider of the present invention is shown removed from a slot in the right viewing tube.
Figure 5:
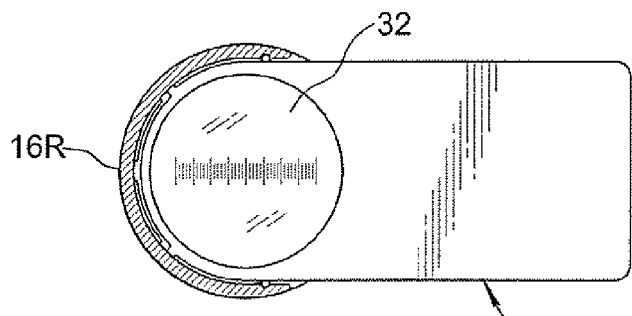
FIG. 5 is a view similar to that of FIG. 4, except that the reticle slider is shown inserted into the slot in the right viewing tube.

As may be seen in FIGS. 4 and 5, slider 28 is generally flat and includes an optical element 32 and a grip portion 34. A perimeter 36 at a leading end of slider 28 is configured, for example with arcuate tabs 37, to engage an inner wall 38 of viewing tube 16R when slider 28 is inserted through slot 26. In this way, optical element 32 is aligned on optical axis 8 of the viewing tube when slider 28 is inserted to the extent permitted. The main body of slider 28 is preferably formed of plastic. A pair of miniature plungers 40 are preferably provided, one on each opposite side of slider 28, for engagement into corresponding recesses 42 in inner wall 38 of viewing tube 16R upon insertion of the slider, whereby the slider is releasably secured to keep optical element 32 aligned on optical axis 8 and prevent accidental removal. A shelf 39 is preferably provided on inner wall 38 of viewing tube 16R to provided support for the leading end of slider 28 to ensure that optical element 32 is situated normal to optical axis 8.

As illustrated in FIG. 3, slot 26 is preferably located at a position along viewing tube 16R such that optical element 32 on slider 28 is proximate to the insertion end 20 of eyepiece 18 when the insertion end of the eyepiece is received by the viewing tube and the slider is inserted through the slot.

Optical element 32 may be embodied as a reticle having a scale 44 useful for making distance measurements with respect to an observed specimen. Alternatively, optical element may be a filter, polarization analyzer, lens, grating, shutter, or any other optical element. Although not shown, optical element 32 may be mounted in a holder ring that is rotatable relative to the rest of the slider, such as by a dial mechanism coupled to the holder ring through a gear train, wherein the dial mechanism is provided on an exposed portion of slider 28 such as grip portion 34 to enable the optical element to be rotated about optical axis 8 as a user looks through viewing tube 16R. It is also possible to mount the optical element 32 in slider 28 in removable fashion, so that the optical element can be "popped out" and replaced with another optical element of the user's choosing; in this way, one slider 28 can be used to introduce various optical elements into the viewing tube.

In the embodiment described herein, slot 26 is provided in right viewing tube 16R. However, an alternative or additional slot 26 could be provided, in mirror image arrangement to that shown, in left viewing tube 16L.

As will be appreciated from the foregoing description, slider 28 can be easily withdrawn from slot 26 when optical element 32 is not desired, and collar 30 can be adjusted to cover slot 26 to prevent ambient light from entering the system. Consequently, the invention makes possible rapid change of optical elements in optical axis 8. In this regard, a plurality of interchangeable sliders 28 may be provided, each carrying a different optical element, whereby a variety of applications may be accommodated without requiring disassembly of eyepiece 18 or even removal of the eyepiece from the viewing tube. Accordingly, the present invention further encompasses a method of changing an optical element in a viewing tube of a microscope comprising the steps of: inserting a first slider carrying a first optical element through a circumferential slot in the viewing tube to position the first optical element in the viewing tube; removing the first slider from the slot; and inserting a second slider carrying a second optical element through the circumferential slot in the viewing tube to position the second optical element in the viewing tube. As mentioned above, these steps can be performed without removing the eyepiece from the viewing tube. In some environments, particularly in educational settings, the eyepieces are locked into place in the viewing tubes. Nevertheless, with the present invention, the user may change reticles or other optical elements in the viewing tube while the eyepiece remains in place.

What is claimed is:

1. An apparatus comprising:
    a microscope tube including a viewing tube for receiving an eyepiece, the viewing tube having an optical axis and a circumferential slot extending through a wall of the viewing tube; and
    a slider including an optical element and a grip portion, the slider being removably insertable through the slot in the viewing tube to position the optical element in the optical axis adjacent an eyepiece received in the viewing tube.

2. The apparatus according to claim 1, wherein the microscope tube is a binocular microscope tube having left and right viewing tubes each for receiving a respective eyepiece, and only one of the left and right viewing tubes has a circumferential slot into which the slider is insertable.

3. The apparatus according to claim 2, wherein the right viewing tube has the slot.

4. The apparatus according to claim 1, wherein the slider is shaped to engage the viewing tube to align the optical element with the optical axis.

5. The apparatus according to claim 1, wherein the optical element is a reticle.

6. The apparatus according to claim 1, wherein the optical element is a filter.

7. The apparatus according to claim 1, wherein the optical element is a lens.

8. The apparatus according to claim 1, wherein the slider includes at least one plunger and the viewing tube includes a recess in an wall thereof into which the plunger engages when the slider is inserted through the slot.

* * * * *